May 14, 1957 T. HARRISON 2,791,799
MEAT TENDERIZER
Filed March 31, 1954

INVENTOR.
Taylor Harrison
BY Victor J. Evans & Co.
ATTORNEYS

United States Patent Office 2,791,799
Patented May 14, 1957

2,791,799
MEAT TENDERIZER

Taylor Harrison, Fort Worth, Tex., assignor of one-half to Jack Danciger, Fort Worth, Tex.

Application March 31, 1954, Serial No. 420,150

1 Claim. (Cl. 17—28)

This invention relates to implements used in the culinary arts particularly adapted for domestic and restaurant use, and in particular a meat tenderizer including pivotally connected jaws with handles extended therefrom and with sharp teeth or ridges positioned on both sides thereof whereby with the jaws turned over or reversed the products may be engaged by tenderizing elements or different patterns.

The purpose of this invention is to provide a manually actuated tenderizer whereby surface portions of meat are adapted to be cut into small pieces of various designs and wherein the patterns of the tenderizing elements are readily changeable.

Various types of machines have been provided for tenderizing meat and wherein such machines are adapted and successfully used for hotels and resturants they occupy too much space and are too costly for home use. With this thought in mind this invention contemplates a pair of pivotally connected jaws with handles extended from the jaws and with teeth of different patterns positioned on the jaws and adapted to engage products placed between the jaws and wherein the entire device is adapted to be positioned in a cabinet or drawer suitable for a carving set or the like.

The object of this invention is, therefore, to provide means for forming a meat tenderizer whereby the device, in its entirety, may be held and operated with one hand.

Another object of the invention is to provide a meat tenderizer particularly adapted for home use in which the tenderizing elements are formed in different patterns and wherein the positions of the tenderizing elements are readily changed.

Another important object of the invention is to provide a hand actuated meat tenderizer in which the parts may readily be separated to facilitate cleaning.

A further object of the invention is to provide an improved hand tenderizer having a plurality of tenderizing elements of different designs and in which the positions of the tenderizing elements in relation to handles upon which the tenderizing elements are positioned are readily changed.

A still further object of the invention is to provide a hand actuated meat tenderizer having tenderizing elements of a plurality of patterns thereon in which the device is of a simple and economical construction.

With these and other objects and advantages in view the invention embodies a pair of jaws having sharp meat engaging ribs and elements thereon with the elements on each side of each jaw of a different pattern, with handles extended from the jaws and with means for pivotally connecting the jaws whereby both sides of each jaw are adapted to be positioned for use.

Other features and advantages of the invention will appear from the following description taken in connection with the drawing, wherein.

Figure 3:
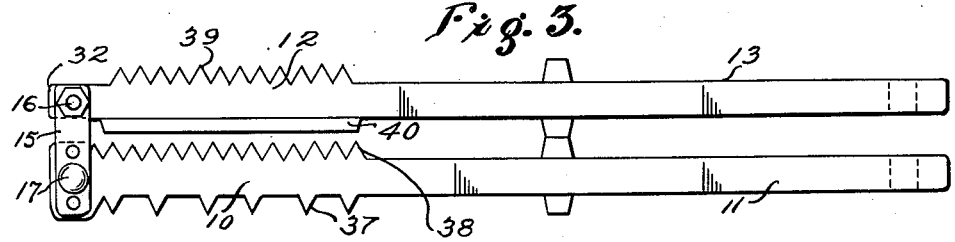
Figure 3 is a side elevational view similar to that shown in Fig. 2 with the positions of the parts reversed wherein products placed between the jaws will be engaged by transversely and longitudinally disposed ribs.
Figure 4:
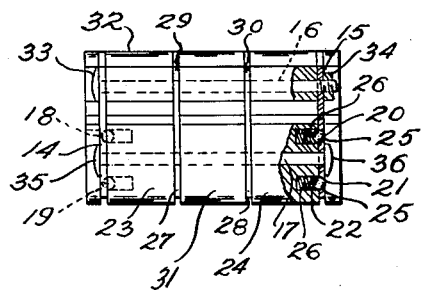
Figure 4 is an end elevational view of the improved meat tenderizer with parts broken away and shown in section to illustrate spring actuated balls for retaining one jaw in operative position with the other jaw.

Referring now to the drawing wherein like reference characters denote corresponding parts the improved meat tenderizer of this invention includes a first jaw 10 having a handle 11 extended therefrom, a second jaw 12 having a handle 13 extended therefrom, side plates 14 and 15 pivotally connected to the jaw 12 with a bolt 16 and similarly connected to the jaw 10 with a bolt 17, the bolt 17 being positioned to coact with balls 18 and 19 at one side of the tenderizer and balls 20 and 21 at the opposite side whereby with the parts positioned as illustrated in Fig. 4 the jaw 10 is positioned below the jaw 12 as shown in Fig. 3.

The balls are positioned in openings 22 in the ends of hub sections 23 and 24 extended from the jaw 10 and the balls are urged outwardly into recesses 25 in the end plates 14 and 15 by springs 26.

Figure 1:
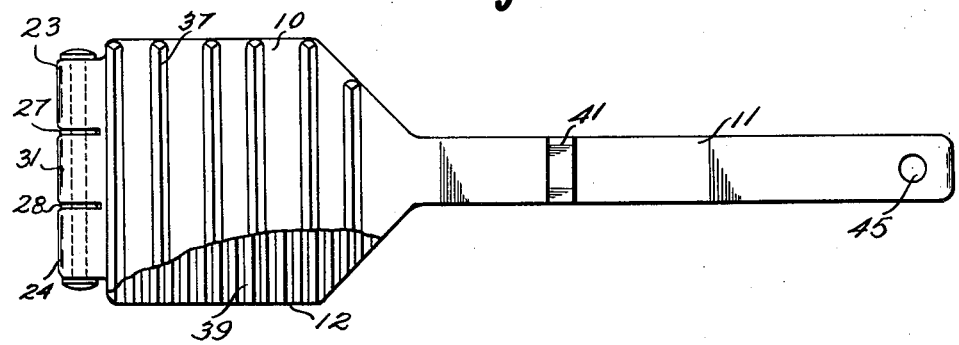
Figure 1 is a plan view of the improved hand actuated meat tenderizer with parts of one jaw broken away to show teeth of a jaw below.

As illustrated in Figs. 1 and 4 the jaws are also connected with intermediate bars 27 and 28 that are positioned in slots 29 and 30, respectively between the hub sections 23 and 24 and an intermediate hub section 31 of the jaw 10, and also between similar hub sections, as indicated by the numeral 32 of the jaw 12.

As illustrated in Fig. 4 the bolt 16 extends through the end and intermediate bars and also through the hub sections 32 of the jaw 12, and one end of the bolt is provided with a head 33 and the other with a nut 34. By this means the bolt 16 is removed to turn the jaw 12 over in relation to the jaw 10 whereby the longitudinally disposed teeth 40 coact with the transversely disposed teeth 38, with the parts positioned as shown in Figure 3, the bolt 16 being replaced after the jaw is in position and the nut 34 threaded thereon. The pin 17 which extends through the bars and hub sections of the jaw 10 is riveted over at the ends providing heads 35 and 36.

The jaw 10 is provided with spaced transversely disposed V-shaped ridges or teeth 37 on one side and similar teeth, as indicated by the numeral 38 on the opposite side and the distance between the teeth 37 is greater than that between the teeth 38. The jaw 12 is provided with transversely disposed ridges or teeth 39, similar to the teeth 38 and also with longitudinally disposed teeth or ridges 40 and, as illustrated in Figs. 2 and 3 the jaws may be positioned with the different types of teeth in coacting relation whereby meat may be tenderized with teeth of the same pattern or with teeth of one pattern engaging one side of the meat and with teeth of a different pattern engaging the opposite side.

Figure 2:
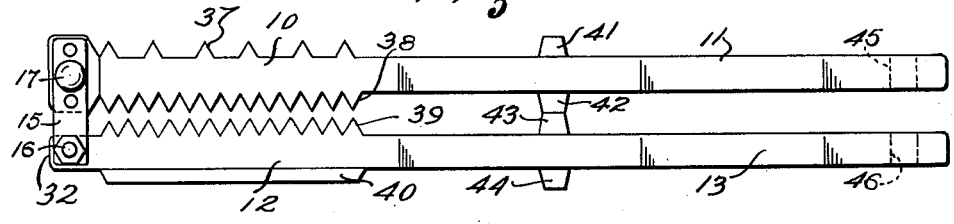
Figure 2 is a side elevational view of the tenderizer.

With the parts as illustrated in Fig. 2, by pulling upwardly on the handle 11 the jaw 10 is adapted to rotate about the pin 17 and the jaw 12 about the bolt 16 whereby the parts are changed from the position shown in Fig. 2 to that shown in Fig. 3 the teeth 38 of the jaw 10 positioned to coact with the teeth 40 of the jaw 12.

The handle 11 of the jaw 10 is provided with lugs or stops 41 and 42 and similar lugs or stops 43 and 44 are provided on the handle 13 of the jaw 12. The handles are also provided with openings, as indicated by the numerals 45 and 46 to facilitate hanging the tenderizer on a hook or the like.

With the parts assembled as illustrated and described it will be appreciated that the different pairs of jaws or sets of teeth thereon are adapted to coact to cut surfaces of meat or the like into relatively small sections whereby meat is tenderized, and adapted for universal use.

It will be understood that modifications, within the scope of the appended claim, may be made in the design and arrangement of the parts without departing from the spirit of the invention.

What is claimed is:

In a meat tenderizer, the combination which comprises a first jaw having meat engaging teeth on a surface thereof, a handle extended from one end and a hub with spaced transversely disposed slots extended therethrough on the end opposite to that from which the handle extends, a second jaw also having meat engaging teeth on one side, a handle extended from one end and a hub with spaced transversely disposed slots extended therethrough on the end opposite to that from which the handle extends, the transversely disposed slots of the hub of the second jaw being positioned in registering relation with the transversely disposed slots of the hub of the first jaw, parallel bars positioned at the ends of the hubs of the jaws and in the slots extended through the hubs, pins extended through the bars and hubs for pivotally mounting the jaws on the bars, one end of the hub of the first jaw having openings extended inwardly and said openings being positioned on opposite sides of the pin extended through the bars and hub, and spring actuated balls positioned in said openings, the inner face of the bar positioned against the end of the hub in which the openings are positioned having recesses therein positioned to receive the spring actuated balls, said handles having lugs thereon to limit closing movements of the teeth of the jaws.

References Cited in the file of this patent

UNITED STATES PATENTS

| | | |
|---|---|---|
| 519,000 | Kull | May 1, 1894 |
| 715,695 | Robinson | Dec. 9, 1902 |
| 896,044 | Quackenbush | Aug. 11, 1908 |
| 1,391,119 | Johnson | Sept. 20, 1921 |
| 1,576,164 | Wafford | Mar. 9, 1926 |
| 1,938,733 | Walling | Dec. 12, 1933 |

FOREIGN PATENTS

| | | |
|---|---|---|
| 15,107 | Great Britain | 1911 |
| 13,121/28 | Australia | Feb. 26, 1929 |